Feb. 25, 1969

A. PIRRELLO ET AL 3,429,423

VIBRATORY BOWL

Filed Aug. 25, 1967

INVENTORS
Antonio Pirrello &
John D. Sproles
BY Peter P. Kozak
ATTORNEY

United States Patent Office 3,429,423
Patented Feb. 25, 1969

3,429,423
VIBRATORY BOWL
Antonio Pirrello, Lincoln Park, and John D. Sproles, Royal Oak, Mich., assignors to General Motors Corporation, Detroit, Mich., a corporation of Delaware
Filed Aug. 25, 1967, Ser. No. 663,333
U.S. Cl. 198—220      7 Claims
Int. Cl. B65g 27/02, 27/16

ABSTRACT OF THE DISCLOSURE

This invention relates to a vibratory feed bowl apparatus adapted to feed chopped glass fibers and a powdered material at a uniform rate to separate conveyor means. The vibratory feed bowl apparatus consists of an inner feed bowl wherein the powdered material is stored and a concentric outer feed bowl wherein the chopped glass fibers are stored. The upstanding cylindrical wall separating the inner and the outer bowl has a spiral helical track on the inner surface thereof which feeds the powdered material at a uniform rate and a spiral helical track on the outer surface which feeds the chopped glass fibers at a uniform rate in a free-flowing manner.

---

Figure 1:
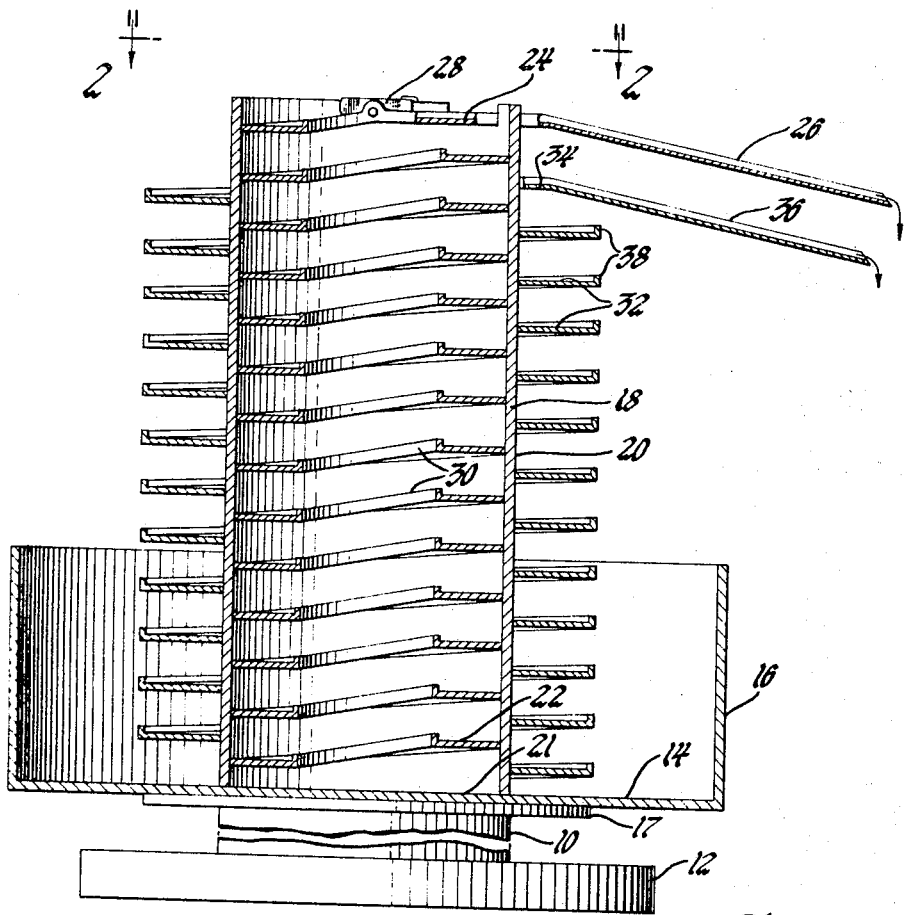

This invention relates to a vibratory feed bowl apparatus, and more particularly to a vibratory feeder bowl apparatus wherein a plurality of materials including chopped glass fibers and a powdered material are fed at a uniform rate to separate conveyor means.

In conventional manufacturing practice of glass fiber reinforced resins, it is often desirable to mix chopped glass fibers with a free-flowing powdered material such as polystyrene prior to adding the fiber mixture to a screw-type extruder. In order to do this effectively, the chopped glass fibers and the polystyrene powder should be fed into the extruder in a free-flowing condition and at a controlled uniform rate. Conventional vibratory feeders of the type to which the present invention relate comprise feeding bowls which are mounted on or otherwise connected to a vibration creating mechanism. A helical track is formed along the inner periphery of the bowl and leads from the bottom of the bowl to an exit port at the top of the bowl. The material is placed in the bottom of the bowl and the free-flowing powdered material is driven upward on the track by the vibration.

Vibratory bowls of the type described do not function satisfactorily with chopped glass fibers due to the tendency of glass fibers to build up a fiber mass large enough to stop the upward flow of the glass fiber on the track. The chopped glass fibers form a stationary fiber mass in the conventional vibratory bowl because of the formation of a stationary chopped glass fiber mass is caused by the centrifugal forces at work during the operation of a vibratory feeding apparatus. The centrifugal forces cause the chopped glass fibers to gradually move outwardly toward the wall of the bowl. Since the wall prevents all further outward movement, in time sufficient glass fibers pile up near the wall to form a mass that is interlocked to such an extent that the vibrational forces are no longer effective in moving the fiber mass near the wall up the track. Once the fiber mass build-up begins, the size of the mass grows as more glass fibers move up the track and reach the congested area. Prior to this invention, vibratory bowl feeders did not satisfactorily move chopped glass fibers in a continuous free-flowing stream from the bottom of the bowl to the receiving means at the top of the bowl for any considerable length of time.

Accurate control of feeding chopped glass at a uniform rate has been heretofore this invention a problem in making chopped glass fiber-powder mixtures. Previous methods which require individual control of both the chopped glass and the powder material feed rates were very sensitive to small changes in the feed rate of either component thereby making accurate control difficult. It has also been a problem to deliver a sufficient quantity of chopped glass fiber in a feeding apparatus to form a high chopped glass fiber to powdered material ratio for manufacturing processes.

It is the primary object of this invention to provide a vibratory feeder which feeds chopped glass fibers continuously in a free-flowing manner at a uniform rate to the receiving means. It is another object of this invention to provide a single vibratory feeder wherein chopped glass fibers and a powdered material can be fed simultaneously into separate conveyor means. It is still another object of this invention to provide an improved vibratory feeder wherein chopped glass fibers and a powdered material can be fed simultaneously into separate conveyor means at a controlled ratio and at a controlled rate. It is yet another object of this invention to provide an improved vibratory feeder device wherein the chopped glass fibers can be fed at a sufficiently high rate together with a powdered material so that a high chopped glass fiber-to-powdered material ratio can be obtained.

These and other obpects are accomplished by a multiple bowl vibratory feeder having an outer feed bowl concentrically mounted about an inner feed bowl. The two vibrating bowls are separated by an upstanding cylindrical wall. The cylindrical wall has an upwardly extending spiral trackway on the inner surface thereof adapted to carry powdered material from the inner bowl upwardly to conveyor means located at the top thereof. The cylindrical wall has an upwardly extending spiral trackway on the outer surface thereof adapted to carry chopped glass fibers from the outer bowl upwardly to separate receiving means located thereabove. During the operation of the vibratory feeder the chopped glass fibers move up the spiral trackway on the outer surface of the cylindrical walls in a free-flowing manner. The chopped glass fibers do not pile up in a mass sufficient to stop the free-flowing movement thereof at the outer edge of the spiral track since as these chopped fibers pile up at the outer edge, they fall over the edge of the track which has a low retaining wall back into the bottom of the bowl. By preventing the chopped glass fibers from building up to a level which causes a stationary mass, a free-flowing and uniform movement of the chopped glass fibers is insured. The vibratory forces drive an excess of chopped glass fibers and a powdered material to the top of the spiral tracks. At the top of the spiral tracks adjustable baffle means divert the excess chopped glass fibers back into the outer bowl and the excess powdered material back into the inner bowl so that only the desired quantities of each are delivered at a uniform rate to the separate conveyor means.

Other objects and advantages of this invention will be more apparent from the following detailed description, reference being made to the accompanying drawings wherein the preferred embodiment of this invention is shown.

Figure 2:
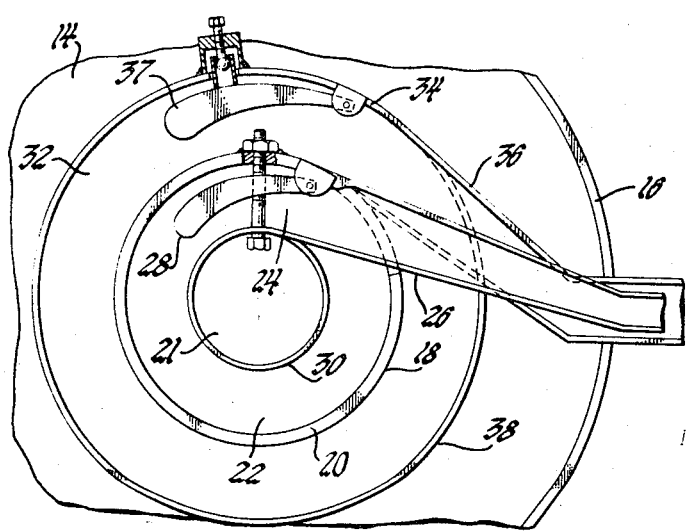

In the drawings:

FIGURE 1 is a side view of the vibratory feeder bowl apparatus partly in cross section and partly in elevation; and FIGURE 2 is an end view of the vibratory feeder bowl apparatus.

Referring now to FIGURE 1, a conventional vibrator 10 which can be driven electrically or mechanically is supported on a base 12 that together with the vibrator 10 forms the vibrating mechanism. A commercially available vibrator unit, Syntron EB-3, works satisfactorily as the vibrator 10. Other vibratory units which are larger or smaller may be used depending upon the quantity of material which is to be moved. The bottom 14 of a cylindrical shaped outer feed bowl 16 is fixedly secured to the upper plate 17 of the vibrator 10 by conventional means, such as welding. An inner feed bowl 18 is concentrically mounted within the outer feed bowl 16. The cylindrical wall 20 of the inner feed bowl 18 is fixedly secured to the bottom 14 of the outer feed bowl 16 by conventional means, such as welding. In this manner actuation of the vibration mechanism causes similar vibration of the inner feed bowl 18 and the outer feed bowl 16.

A spiral trackway 22 on the inner surface of the upstanding cylindrical wall 20 extends upwardly from the bottom 21 of the inner feed bowl 18 to an exit port 24 at the top of wall 20. Conveyor means 26 in the form of a track extension or the like is connected to the spiral trackway 22 at the exit port 24. As shown in FIGURE 2, a baffle member 28 is associated with the trackway 22 at exit port 24 to displace the excess powdered material. The baffle member 28 directs the excess powdered material to fall from the trackway 22 to the bottom 21 of the inner feed bowl 18. The spiral track 22 has a retaining wall 30 in the form of a vertical flange at the outer edge thereof. The height of the retaining wall 30 and the width of the track 22 determine the quantity of the powdered material which is conveyed up to the baffle member 28. The height of the wall 30 and the width of the track 22 are not critical. The wider the track 22 and the higher the wall 30, the larger the quantity of powdered material that is conveyed upward.

A spiral trackway 32 on the outer surface of the upstanding cylindrical wall 20 extends upwardly from the bottom 14 of the outer feed bowl 16 to an exit port 34 near the top of the wall 20. Conveyor means 36 in the form of a track extension or the like is connected to the spiral trackway 32 at the exit port 34. A baffle member 37 is associated with the trackway 32 at the exit port 34 to displace the excess chopped glass fibers. The baffle member 37 directs the excess chopped glass fibers to fall from the trackway 32 to the bottom 14 of the outer feed bowl 16. Spiral trackway 32 has a vertical retaining member 38 in the form of a vertical flange. The width of the track 32 and the height of the vertical retaining member 38 determines the quantity of chopped glass fibers which is conveyed up to the baffle member 37. The width of the track 32 is not critical. In the preferred embodiment the width of the trackway 32 is about 2 to 3 inches. The height of the vertical flange 38 is critical since it prevents the fibers from building up to a level at which the fibers would no longer move up the track in a free-flowing movement. Chopped glass fibers which reach a certain height are no longer moved by vibration and tend to cause the fibers at a lower level to build up and block the trackway. The height of the vertical flange 38 ranges from about ¼ to ¾ inch. Heights of the flange 38 higher than ¾ inch are not desirable because the chopped fiber mass has a tendency to back up and stop moving upward on the track. In addition to not flowing freely, chopped glass masses of this size are not readily mixable with other powdered materials since this mass has a tendency to remain in a clump. Experiments show that chopped glass fibers move in a free-flowing state up a track 2 inches wide having a vertical retaining member ⅜ of an inch high. Similar desirable results are obtained on a track 3 inches wide where the vertical retaining member is ¾ of an inch high.

In operation, a quantity of chopped glass fibers is placed in the outer bowl 16 and a quantity of powdered material such as polystyrene powder is placed in the inner bowl 18. Activation of the vibrator 10 causes the powdered material to move up the spiral trackway 22 from the bottom of the inner bowl 18 to the top of the cylindrical wall 20 in a conventional manner. The width of the track 22 and the height of the vertical flange 30 are designed so that an excess of powdered material is delivered to the baffle member 28 which diverts the excess of the powdered material off of the track so that it falls to the bottom of the inner bowl 18. The desired quantity of powdered material passes through the exit port 24 to the conveyor means 26.

Activation of the vibrator 10 causes the chopped glass fibers to move from the bottom of the outer bowl 16 up the spiral trackway 32 up to baffle member 37. As the chopped glass fibers move on the trackway 32 they have a tendency to move outwardly on the trackway 32 toward the retaining member 38 and the height of the chopped glass fiber as a result is higher near the flange 38 than elsewhere on the track. Chopped glass fibers which reach a height somewhat higher than that of the flange 38 move over the top of the flange 38 and fall back to the bottom of the outer bowl 16. The chopped glass fibers must be placed on the outer bowl 16 and driven up the spiral trackway 32 which is mounted on the outer surface of the cylindrical walls so that the height of the chopped glass fibers does not reach a level which would cause the fibers to block up and stop moving in a free-flowing state.

It has been observed that the use of the inner bowl 18 with the spiral track 22 mounted on the inner surface of the cylindrical wall is not suitable for the practice of this invention since in this case the chopped glass fibers tend to move toward the cylindrical wall until a glass fiber height is reached which causes the free-flowing movement of the chopped glass fibers to stop.

The width of the track 32 is designed so that an excess of chopped glass fibers is delivered to the baffle member 37 which diverts the excess of the chopped glass fibers off of the track so that it falls to the bottom of the outer bowl 16. The desired quantity of chopped glass fibers passes through the exit port 34 to the conveyor means 36.

This vibratory bowl apparatus is particularly well suited for forming chopped glass fiber-polymer powder mixtures containing up to 40 weight percent glass. The use of this vibratory feeder in a method for preparing chopped glass fiber-polystyrene molded parts is fully described in co-pending patent application Ser. No. 663,334.

What is claimed is:

1. A vibratory feeding apparatus for feeding chopped glass fibers and a free-flowing powdered material simultaneously to separate conveyor means comprising an inner feed bowl having an upstanding cylindrical wall, a first feed track attached to the inner surface of said upstanding cylindrical wall adapted to receive said powdered material from the bottom of said inner feed bowl and extending upwardly to a first conveyor means at the top of said wall, an outer feed bowl concentrically associated with said inner feed bowl, a second feed track attached to the outer surface of said cylindrical wall adapted to receive said chopped glass fibers from the bottom of said outer feed bowl and extending upwardly to a second conveyor means at the top of said wall, said second feed track having a vertical retaining member extending upward from the outer edge thereof, said vertical retaining member being operative to maintain said chopped fibers on said track in a free-flowing condition by letting those chopped fibers which would disrupt the free-flowing condition fall back to the bottom of said outer feed bowl, and vibratory means supporting said inner feed bowl and said outer feed bowl adapted to vibrate said bowls whereby said chopped glass fibers from said outer bowl are driven upwardly along said second feedtrack in a free-flowing manner and said second material from said inner feed bowl is driven upwardly along said first feed track to said separate conveyor means.

2. A vibratory feeding apparatus as described in claim 1 wherein said vertical retaining member is in the form of a vertical wall extending ¼ to ¾ inch above said second feed track.

3. A vibratory feeding apparatus as described in claim 1 wherein said first conveyor means is an elongated trough.

4. A vibratory feeding apparatus as described in claim 1 wherein said vertical retaining member is an upturned flange.

5. A vibratory feeding apparatus as described in claim 1 wherein the rate of vibration of said vibratory means is adjustable.

6. A vibratory feeding apparatus for simultaneously feeding chopped glass fibers and a free-flowing powdered material at a controlled uniform rate to separate conveyor means comprising an inner feed bowl having an upstanding cylindrical wall, a first feed track attached to the inner surface of said upstanding cylindrical wall adapted to receive said powdered material from the bottom of said feed bowl and extending upwardly to the top of said wall, first conveyor means attached to said first feed track at the top of said wall, a first baffle member attached to said first feed track at the top of said wall to regulate the flow of said free-flowing powdered material into said conveyor means, an outer feed bowl concentrically associated with said inner feed bowl, a second feed track attached to the outer surface of said cylindrical wall adapted to receive said chopped glass fibers from the bottom of said feed bowl and extending upwardly to the top of said wall, said second feed track having a vertical retaining wall member extending upward from the outer edge thereof, said vertical retaining wall member being operative to maintain said chopped fibers on said track in a free-flowing condition by letting those chopped fibers which would disrupt the free-flowing condition fall back to the bottom of said outer feed bowl, second conveyor means attached to said second feed track at the top of said wall, second baffle member attached to said second feed track at the top of said wall to regulate the flow of said chopped fibers into said second conveyor means, and vibratory means supporting said inner feed bowl and said outer feed bowl adapted to vibrate said bowls whereby an excess of said chopped glass fibers from said outer bowl are driven upwardly along said second track in a free-flowing manner to said second baffle member and an excess of said free-flowing powdered material is driven to said first baffle member.

7. A vibratory feeding apparatus as described in claim 6 wherein said baffle member is adjustable.

References Cited

UNITED STATES PATENTS 2,918,070  12/1959  Carrier _____ 198—220

EDWARD A. SROKA, *Primary Examiner.*